United States Patent [19]

Jourquin et al.

[11] Patent Number: 5,194,453

[45] Date of Patent: Mar. 16, 1993

[54] METHOD FOR THE MANUFACTURE OF FLEXIBLE POLYURETHANE FOAM

[75] Inventors: Lucien Jourquin, Wetteren; Eddie DuPrez, Brakel; Rudi Mortelmans, Ghent, all of Belgium

[73] Assignee: Recticel, Belgium

[21] Appl. No.: 756,709

[22] Filed: Sep. 9, 1991

[30] Foreign Application Priority Data

Sep. 14, 1990 [BE] Belgium .............................. 09000877

[51] Int. Cl.⁵ .............................. C08J 9/08; C08J 9/12; C08G 18/48
[52] U.S. Cl. .................................. 521/131; 521/159; 521/174; 521/176
[58] Field of Search ................ 521/131, 174, 176, 159

[56] References Cited

U.S. PATENT DOCUMENTS

| | | | |
|---|---|---|---|
| 3,108,976 | 10/1963 | Knox | 521/159 |
| 3,753,933 | 8/1973 | Olstowski et al. | 521/137 |
| 3,792,073 | 2/1974 | Prokai et al. | 528/29 |
| 3,862,879 | 1/1975 | Barron et al. | 521/174 |
| 3,947,386 | 3/1976 | Prokai et al. | 521/174 |
| 3,989,869 | 11/1976 | Neumaier et al. | 521/67 |
| 4,008,188 | 2/1977 | Alexander | 521/171 |
| 4,266,042 | 5/1981 | Park | 521/174 |
| 4,275,172 | 6/1981 | Barth et al. | 521/117 |
| 4,514,524 | 4/1985 | Fesman | 521/128 |
| 5,011,908 | 4/1991 | Hager | 528/392 |
| 5,064,872 | 11/1991 | Monstrey et al. | 521/131 |

FOREIGN PATENT DOCUMENTS

| | | |
|---|---|---|
| 0023749 | 2/1981 | European Pat. Off. . |
| 0044226 | 1/1982 | European Pat. Off. . |
| 0269346 | 6/1988 | European Pat. Off. . |
| 0273099 | 7/1988 | European Pat. Off. . |
| 2121520 | 8/1972 | France . |
| 2548197 | 1/1985 | France . |

Primary Examiner—John Kight, III
Assistant Examiner—Rabon Sergent
Attorney, Agent, or Firm—Sughrue, Mion, Zinn, Macpeak & Seas

[57] ABSTRACT

A method for the manufacture of flexible polyurethane foam of a density between 35 and 70 kg/m³ and having improved comfort properties, wherein a reaction mixture is composed containing at least a polyether polyol of equivalent weight between 1400 and 2800 and having a primary hydroxyl group content of more than 50%, an organic polyisocyanate, a catalyst and 0.5 to 1% by weight water with respect to the total foam weight and wherein, in order to allow the reaction mixture to expand up to said density by means of this limited amount of water and by means of up to 1.5 mole of a physical blowing agent per mole polyol, the reaction mixture is frothed mechanically and/or the reaction mixture is allowed to expand under a reduced pressure.

16 Claims, No Drawings

METHOD FOR THE MANUFACTURE OF FLEXIBLE POLYURETHANE FOAM

The present invention relates to a method for the manufacture of flexible polyurethane foam having a density between 35 and 70 kg/m$^3$, wherein a reaction mixture is composed containing as components at least a polyether polyol of equivalent weight between 1400 and 2800 and having a primary hydroxyl group content of more than 50%, an organic polyisocyanate, water, at least one catalyst and possibly cross-linkers/ extenders and foam stabilizers and this mixture is allowed to react so as to form the polyurethane foam.

In the production technology of flexible polyurethane foams there is continuously aimed at improving the quality of the manufactured polyurethane foams and more in particular at improving the so-called comfort properties of these foams. Indeed, such flexible polyurethane foams are mainly used as a comfort material in furniture, mattresses and car seats.

The comfort properties of flexible polyurethane foam are a direct result of the chemical and physical structure of the material and are expressed in a number of parameters determined by means of physical tests such as the hardness as a function of the identation, the elasticity, the air permeability, the resistance against remaining deformation and the dimensional and hardness losses after dynamic and static fatigue under variable climatological conditions.

It is known that the comfort properties of flexible polyurethane foams are improved as the density of the foam increases. An increase of the density is however restricted since objects, such as for example mattresses made from heavier foams, are not only less easy to handle but they are also very much more expensive.

In the present production technology of flexible polyurethane foams having a density between 35 and 70 kg/cm$^3$, the density of these foams is solely determined by the addition of an amount of chemical and usually physical blowing agents. When use is made of water as a chemical blowing agent, 1 to 2.5% by weight water has to be added with respect to the total foam weight in the known production processes in order to obtain the desired density between 35 and 70 kg/m$^3$.

Further, it is known that in order to obtain a foam with good comfort properties, an optimal equilibrium between the polymerization and the blowing reactions has to be realized. This means amongst others that the ratio between the used physical and chemical blowing agents cannot be chosen completely freely. Indeed, the reaction temperature depends on this ratio, which temperature is, in its turn, one of the factors determining the reaction speeds. Since the chemical blowing agent reacts through an exothermic reaction with the organic polyisocyanate so as to form $CO_2$ -gas, whereas the evaporation of the physical blowing agent requires on the other hand heat, the temperature during the foaming process will also increase as the ratio between chemical and physical blowing agent increases and, inversely, this temperature will decrease as the ratio between the chemical and physical blowing agent decreases. The reaction speeds will respectively increase or decrease accordingly.

In the present production technology there is aimed at obtaining the highest possible quality amongst others by optimizing the amount of blowing agents as well as their mutual ratio. A drawback of the known production techniques is however that the quality of the thus manufactured polyurethane foams with a density between 35 and 70 kg/ m$^3$ is still worse than the quality of for example latex foams, which have however usually a density of above 65 kg/ m$^3$, and which are therefore much more expensive than polyurethane foams with a density between 35 and 70 kg/ m$^3$. More particularly, these polyurethane foams have less good comfort properties then the latex foams.

An object of the invention is therefore to provide a method which allows to manufacture flexible polyurethane foams with improved comfort properties.

To this end, use is made of 0.5 to 1% by weight of water with respect to the total foam weight, up to 1.5 mole of a physical blowing agent is added at the most, per mole polyol, to the reaction mixture and, in order to limit the density of the polyurethane foam within the hereabove mentioned density limits, at least one of the two following density reducing techniques is applied, a first technique of which consists in forming a mechanically frothed reaction mixture ("froth") of a reduced density when preparing the reaction mixture and a second technique of which consists in allowing the reaction mixture to expand under a pressure lower than the atmospheric pressure.

The application of the hereabove mentioned density reducing techniques is already known per se for the production of known foam materials. However, it was found now surprisingly that by replacing the chemical and/or physical blowing agents in the production of the flexible polyurethane foams according to the invention partially by at least one of these techniques, flexible polyurethane foams with better comfort properties can be manufactured.

In a particular embodiment of the invention, the reaction mixture is allowed to expand under a pressure which is 0.1 to 0.9 bar lower than the atmospheric pressure, so that the reaction mixture expands up to a bigger volume.

In a preferred embodiment of the invention, a mechanically frothed reaction mixture of a density comprised between 70 and 700 kg/m$^3$ is formed when preparing the reaction mixture so that, at the beginning of the expansion by the blowing agents, a reduced density is already obtained. Without mechanically frothing the reaction mixture, the density of the latter is substantially equal to 1100 kg/m$^3$.

In a further preferred embodiment of the invention, use is only made of water as a blowing agent for the expansion of the reaction mixture. An important advantage of this embodiment is that in this way no harmful gases are liberated as it is indeed the case when use is made of for example chlorine-fluorine containing hydrocarbons (CFC's) as a physical blowing agent.

Other particularities and advantages of the invention will become apparent from the following description of a method for the manufacture of a flexible polyurethane foam according to the invention; this description is only given by way of example and does not limit the scope of the invention.

The invention relates to a method for the manufacture of flexible polyurethane foam having a density situated between 35 and 70 kg/m$^3$ and preferably between 40 and 65 kg/m$^3$. The object of this invention is to provide a method which allows to obtain a polyurethane foam having better comfort properties than the polyurethane foam of substantially the same density but obtained according to a conventional production process.

Even as in the conventional production process, a reaction mixture is composed in the method according to the invention with as components at least a polyether polyol, an organic polyisocyanate, water, at least one catalyst and possibly also cross-linkers/extenders and foam stabilizers. Then, this reaction mixture is allowed to expand upto the desired density by means of blowing agents. One of these blowing agents is the hereabove mentioned water which reacts with the polyisocyanate through an exothermic reaction so as to form $CO_2$-gas. Beside this so-called chemical blowing agent, physical blowing agents can also be used.

In the conventional techniques for the manufacture of flexible polyurethane foam, the whole density reduction is realized by allowing the reaction mixture of a density of about 1100 kg/m$^3$ to expand under atmospheric pressure by means of blowing agents. This requires a certain amount of blowing agents including a certain amount of water.

According to the invention, a polyurethane foam with better comfort properties can be obtained by restricting the amount of water in the reaction mixture to 0.5 to 1% by weight of the final total foam weight and by using per mole polyol no more than 1.5 mole of a physical blowing agent. The polyol has to be a polyether polyol having a primary hydroxyl group content of more than 50% of the total hydroxyl group content and an equivalent weight situated between 1400 and 2800. By the restriction of the amount of blowing agents, without additional measures, a polyurethane foam of a density between 60 to 140 kg/m$^3$ would be obtained.

Preferably, the amount of water in the reaction mixture is restricted even to 0.5 to 0.8% by weight of the total foam weight and no physical blowing agent is used, but only water is used as chemical blowing agent for the expansion of the reaction mixture.

In order to compensate for the smaller amount of blowing agents, at least one of the following density reducing techniques is applied in the method according to the invention.

A first density reducing technique consists in that a mechanically frothed reaction mixture ("froth") is formed before starting the polymerization and blowing reactions. This can be realized by adding air or another gas to the reaction mixture when preparing the latter. More in particular, this can be realized by frothing polyol and isocyanate by means of for example a mixer or by blowing an inert gas therethrough and by adding only thereafter the other reaction components such as catalysts and water. Preferably, the density of the reaction mixture is reduced in this manner to 70 to 700 kg/m$^3$.

The first density reducing technique has the advantage that it can be easily applied, in particular also when the reaction mixture is allowed to expand between two belts of a continuous double-belt machine. These belts are disposed at a mutual distance of 0.01 to 0.2 m and have a width of 1 to 2.5 m. This machine allows to manufacture a continuous plate of foam material which can for example be cut into mattresses and the like.

A second density reducing technique which can be applied according to the invention, consists in that the expansion of the reaction mixture is enhanced by carrying out this expansion under a pressure lower than the atmospheric pressure. Preferably, this pressure is 0.1 to 0.9 bar lower then the atmospheric pressure. Both techniques can possibly be combined.

Beside the hereabove mentioned components, flame retardants are added, in a preferred embodiment of the invention, to the reaction mixture. Suitable flame retardants include melamine in an amount of 5 to 100 parts per 100 parts polyol and linear ureaformaldehyde oligomer mixtures having the general formula

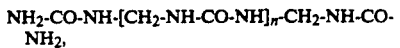

$NH_2$-CO-NH-[$CH_2$-NH-CO-NH]$_n$-$CH_2$-NH-CO-$NH_2$, wherein n can have a value from 0 to 10, in an amount to 5 to 75 parts per 100 parts polyol. Further, 5 to 25 parts of halogenated organic flame retardants such as TCEP, TCPP, TDCP, . . . per 100 parts polyol can also be added to the reaction mixture.

The polyether polyols which are used in the method according to the invention, have an equivalent weight between 1400 and 2800 and a primary hydroxyl group content of more than 50%. They contain upto 45% by weight at the most of an organic dispersed or dissolved solid substance. In a particular embodiment, they contain 1 to 45% by weight of an organic dispersed or dissolved solid substance, which solid substance corresponds to one of the following types:
- a polyaddition product of an alkanolamine with an organic polyisocyanate;
- a polymerization product of an organic polyisocyanate with a polyamine and/or hydrazine and/or hydrazide;
- a vinylcopolymer such as for example reaction products of acrylonitrile with styrene.

Polyether polyols which are suited to be used in the method according to the invention include these polyether polyols which are prepared by allowing one or more alkylene oxides or substituted alkylene oxides to react with one or more active hydrogen containing initiators. Suitable oxides are for example ethylene oxide, propylene oxide, tetrahydrofuran, butylene oxides, styrene oxide, epichlorhydrin and epibromhydrin. Suitable initiators are for example water, ethylene glycol, propylene glycol, butanediol, hexanediol, glycerol, trimethylol propane, pentaerythritol, hexanetriol, hydroquinone, resorcinol, catechol, bisphenols, novolac resins and phosphoric acid. Further suitable initiators are for example ammonia, ethylenediamine, diaminopropanes, diaminobutanes, diaminopentanes, diaminohexanes, ethanolamine, aminoethylethanolamine, aniline, 2,4-toluenediamine, 2,6-toluenediamine, 2,4'-diaminodiphenylmethane, 4,4'-diaminodiphenylmethane, 1,3-phenylenediamine, 1,4-phenylenediamine, naphthalene-1,5-diamine, 4,4'-di(methylamino)-diphenylmethane, 1-methyl-2-methylamino-4-aminobenzene, 1,3-diethyl-2,4-diaminobenzene, 2,4-diamonomesitylene, 1-methyl-3,5-diethyl-2,4-diaminobenzene, 1-methyl-3,5diethyl-2,6-diaminobenzene, 1,3,5-triethyl-1,2,6-diaminobenzene and 3,5,3',5'-tetraethyl-4,4'-diaminodiphenylmethane.

The organic polyisocyanates employed in the method according to the invention include those represented by the general formula Q(NCO)i, wherein i has an average value of at least 2 and is usually no more than 6 and wherein Q represents an aliphatic, cycloaliphatic or aromatic radical which can be an unsubstituted hydrocarbyl group or a hydrocarbyl groupe substituted, for example, with a halogen or an alkoxy group. So, Q can be for example an alkylene, a cycloalkylene, an arylene, an alkyl substituted cycloalkylene, an alkarylene or an aralkylene radical including corresponding halogen- and alkoxy-substituted radicals.

Typical examples of polyisocyanates which can be used in the method according to the present invention, are the following products and mixtures thereof: 1,6-hexamethylenediisocyanate, 1,4-tetramethylenediisocyanate, 4,4'-diphenylmethane diisocyanate, phenylene diisocyanates such as 4-methoxy-1,4-phenylene diisocyanate, 4-chloro-1,3-phenylene diisocyanate, 4-bromo-1,3-phenylene diisocyanate, 5,6-dimethyl-1,3-phenylene diisocyanate, 2,4-toluene diisocyanate, 2,6-toluene diisocyanate and crude tolene diisocyanates.

For the preparation of flexible polyurethane foams the following organic polyisocyanates are used in general:

1) mixtures of pure 2,4 and 2,6-toluene diisocyanate (TDI);
2) pure 4,4'-diphenylmethane diisocyanate and mixtures thereof with other isomers of diphenylmethane diisocyanate (MDI);
3) partially polymerized, crude MDI, i.e. methylene bridged polyphenylpolyisocyanates prepared by phosgenation of mixtures of polyamines obtained by condensation of aniline and formaldehyde;
4) prepolymers and oligomers obtained by reacting pure TDI, pure MDI or crude MDI with isocyanate reactive compounds, such as glycols, polyols or mixtures thereof;
5) modified pure TDI, pure MDI, crude MDI or prepolymers thereof in which a proportion of the isocyanate groups are converted into other functional groups, such as carbodiimide, isocyanurate, uretonimine, urethane, urea, biuret or allophanate groups;
6) mixtures of the above mentioned TDI and MDI based polyisocyanates.

In a preferred embodiment of the method according to the invention, use is made as the organic polyisocyanate of an organic polyisocyanate consisting mainly of pure, crude or prepolymerized MDI or of a mixture thereof.

In general, the polyol and polyisocyanate components are employed in relative amounts such that the ratio of the total number of —NCO equivalents to the total number of active hydrogen equivalents is comprised between 0.6 and 1.5 and preferably between 0.7 and 1.2. This ratio is the so-called isocyanate index and is often also expressed as a percent of the stoechiometric amount of polyisocyanate required to react with the total amount of active hydrogen. When expressed as a percent, the isocyanate index is thus situated between 60 and 150 and preferably between 70 and 120.

In the method according to the invention, blowing agents are used to control the final density of the polyurethane foam. To this end, at least water is used as a chemical blowing agent possibly together with other blowing agents, such as formic acid or derivatives thereof, which form $CO_2$-gas by reaction with the isocyanate groups.

Suitable physical blowing agents, up to 1.5 mole of which may be used in the method according to the invention at the most, include the following low boiling substances: acetone, ethylacetate, methylformate, ethylformate, methanol, ethanol, methylene chloride, chloroform, ethylidene chloride, ethylbromide, vinylidene chloride, bromoethane, 1,1,1-trichloroethane, 1-chloropropane, 2-chloropropane, chloropropene, 1,1,1-trifluoro-2,2-dichloroethane, 1,1,1,2-tetrafluoroethane, dichlorofluoroethane, chloro-1,2,2,2-tetrafluoroethane, trichlorofluoromethane, dichlorodifluoromethane, trichlorofluoroethane, dichlorotetrafluoroethane, butane, hexene, heptane, diethylether and the like. A blowing effect can also be obtained by adding compounds which decompose at temperatures above room temperature to liberate gases, for example azo compounds, such as azoisobutyric acid nitrile which liberates nitrogen gas.

In the method according to the invention, the polymerization reaction is effected in the presence of a small amount of a catalyst. This component of the reaction mixture usually contains a tertiary amine. Suitable amine catalysts include one or more of the following substances: N-methylmorpholine; N-ethylmorpholine; N-octadecylmorpholine; triethylamine; tributylamine; trioctylamine; N,N,N',N'-tetramethylethylenediamine; N,N,N',N'-tetramethyl-1,3-butanediamine; triethanolamine; N,N-dimethylethanolamine; triisopropanolamine; N-methyldiethanolamine; hexadecyldimethylamine; N,N-dimethylbenzylamine; trimethylamine; N,N-dimethyl-2-(2-dimethylaminoethoxy) ethylamine, also known as bis(2-dimethylaminoethyl)ether; triethylenediamine (1,4-diazobicyclo(2,2,2)octane); formate and other salts of triethylenediamine; oxyalkylene polyaddition products of the amino groups of primary and secondary amines and other such amine catalysts which are well known in the art of polyurethane manufacture.

The amine catalyst may be introduced to the polyurethane producing reaction mixture as such or as a solution in suitable solvents such as diethylene glycol, dipropylene glycol and 2-methyl-2,4-pentanediol ("hexylene glycol"). The reaction mixture contains preferably per 100 parts by weight of the polyol component about 0.05 to 3 parts by weight of amine catalyst.

In manufacturing polyurethane foam according to the method of the invention, a small amount of certain metal catalysts can be included in the catalyst components. Useful metal catalysts include amongst others organic tin derivatives, in particular tin compounds of carboxylic acid such as stannous octoate, stannous oleate, stannous acetate, stannous laurate dibutyltin dilaurate and other such tin salts. Additional metal catalysts are organic derivates or other polyvalent metals such as zinc and nickel (e.g. nickel acetylacetonate). In general, the amount of such metal catalysts which can be present in the reaction mixture is comprised between about 0.05 to about 2 parts by weight per 100 parts by weight of the polyol components.

In the method according to the invention, cross-linkers/extenders may further be added to the reaction mixture. This is also done in particular in the known methods for the manufacture of high resilient flexible polyurethane foams, which methods are based on the use of more reactive polyether polyol types, having a primary hydroxyl groups content of more than 50% by weight, as in the method according to the invention.

Cross-linkers/extenders are low molecular compounds with a molecular weight not higher than 400 and a functionality of at least 2. They can be selected for example from the group of the following polyalcohols and/or completely substituted alkanolamines: glycerol, trimethylolpropane, ethylene glycol, propylene glycol, diethylene glycol, dipropylene glycol, butanediol, triethanolamine.

The functionality of at least 2 can also relate to at least 1 functional OH-group and at least 1 functional NH (or NH$_2$)-group or at least 2 functional NH (or NH$_2$)-groups, in such a manner that the used cross-linkers/extenders can comprise one or more alkanolamines and/or polyamines such as mono- and diethanolamine, diisopropanolamine. Alkyl substituted derivatives and alkylene oxide polyaddition products can also be used.

In the method according to the invention, use is further possibly also made of surfactants. A surfactant contributes to the production of high grade polyurethane foams since in the absence of such a substance, the foam can be instable or may contain large uneven cells. Numerous surfactants have been found satisfactory. In particular, the non-ionic surfactants such as the known silicones, usually polyalkylsiloxane polyether copolymers, have been found to be very suitable. Other surfactants include amongst others polyethylene glycol ethers of long chains alcohols, tertiary amine or alkanolamine salts of long chain alkyl acid sulfate esters, alkylsulfonic esters and alkylarylsulfonic acids.

If necessary, other additives such as fillers, cell-openers, pigments, anti-oxidantia and other components which are known in the art of preparing polyurethane foams may be added to the reaction mixture.

The in this invention described method for the manufacture of flexible polyurethane foam with improved comfort properties can be applied to manufacture by means of the known production methods flexible polyurethane foam, i.e. according to the continuous block-process (slabstock) or in closed moulds (moulding). The method can also be applied for the manufacture of flexible polyurethane foam on a continuous double belt machine wherein the reaction mixture is preferably applied as a froth between the belts of this machine and is allowed to expand therebetween.

The following raw materials have been used in the following examples:

P1: Polyether polyol having an equivalent weight of 1700 and a primary hydroxyl group content of 60%, which contains 10% by weight of an organic dispersed solid substance (a polymerization product of the reaction of an organic polyisocyanate with a polyamine).

P2: Polyether polyol having an equivalent weight of 1800 and a primary hydroxyl group content of 70%, which contains 15% by weight of a dispersed styrene-acrilonitrile block copolymer.

P3: Polyether polyol having an equivalent weight of 2100 and a primary hydroxyl group content of 85%.

I1: Mixture of 80% by weight of 2,4-toluene diisocyanate and 20% by weight of 2,6-toluene diisocyanate.

I2: Mixture of prepolymerized pure and crude MDI having a NCO-content of 25%.

CAT 1: Mixture of 70% by weight bis(2-dimethylaminoethyl)ether and 30% by weight dipropylene glycol.

CAT 2: Mixture of 33% by weight of triethylenediamine and 67% by weight dipropylene glycol.

SH209: Relative weak stabilizing silicon surfactant (Union Carbide).

TCEP: Tris(2-chloroethyl)-phosphate flame retardant.

R 11: Trichlorofluoromethane (CFC 11).

Diethanolamine, tin (II) octoate and melamine.

The following other abbreviations and test methods have been used:

Pressure: A = atmospheric pressure.

The other pressures are indicated as underpressure with respect to the existing atmospheric pressure: for example $-0.35$ means 0.35 bar below the atmospheric pressure (= about 0.65 bar absolute pressure).

CLD 40%: Hardness at 40% compression in kPa according to ISO 3386.

Elasticity: In % according to ASTM D 3574.

CS 90%: Resistance against remaining deformation at 90% compression, 22 hours, 70° C. (dry compression set) in % height loss with respect to original height according to ISO 1856 B.

WCS 70%: Resistance against remaining deformation at 70% compression, 22 hours, 50° C., 95% relative humidity (wet compression set) in % height loss with respect to the compressed height according to the modified Renault 1637 method.

DF: Dynamic fatigue test with constant loading according to ISO 3385.
  $\Delta h$ = thickness loss at a 5N load.
  $\Delta H$ = hardness loss ILD 40% according to ISO 2439 B.

SF: Static fatigue test with proportional loading according to BS 3379.
  $\Delta h$ = thickness loss at a 2 kg load
  $\Delta H$ = hardness loss ILD 40% according to ISO 2439 B.

It will be clear that the so-called comfort properties of a polyurethane foam are better as the elasticity is higher and as the results of the CS- and the WCS-tests as well as the $\Delta h$- and the $\Delta H$-values of the DF- and SF- are smaller.

By the handmix method, blocks of flexible polyurethane foam having as dimensions 40×40×30 cm were prepared so that also dynamic and static fatigue tests could be carried out. To this end, an appropriate amount of reaction mixture was mixed homogeneously at 3500 RPM in a beaker and was then poured out in an open box of above mentioned dimensions. The expansion of the foam was then terminated either in the free atmosphere or in a vacuum chamber.

In the cases wherein air was added, a froth was first obtained by loading the mixture polyol/isocyanate/silicon (and possibly flame retardants) in an Oakes mixer with the appropriate amount of air, after which water and catalysts were added. The further expansion of the foam was then carried out, except for example 12, as described hereinabove in an open box, under the influence of the chemical blowing agent water and in example 4 also under the influence of a physical blowing agent. In example 12, the reaction mixture was allowed to expand in a closed box in such a manner that the expansion of the foam was limited. 48 hours after the expansion, the foam samples were cut into pieces and tested as to their physical properties.

The chemical composition of the different mixtures, the experiment conditions and the results of the physical tests on the foam samples are represented in the following table.

| EXAMPLE | 1 | 2 | 3 | 4 | 5 | 6 | 7 | 8 | 9 | 10 | 11 | 12 |
|---|---|---|---|---|---|---|---|---|---|---|---|---|
| Polyol (100 parts) | P1 | P1 | P1 | P1 | P2 | P2 | P2 | P2 | P3 | P3 | P3 | P3 |

-continued

| EXAMPLE | 1 | 2 | 3 | 4 | 5 | 6 | 7 | 8 | 9 | 10 | 11 | 12 |
|---|---|---|---|---|---|---|---|---|---|---|---|---|
| Water | 2,0 | 1,2 | 1,0 | 1,2 | 3,0 | 1,2 | 3,5 | 1,5 | 1,5 | 0,8 | 2,0 | 1,0 |
| R11 | — | — | — | 9 | — | — | — | — | — | — | — | — |
| Isocyanate index | 104 | 111 | 114 | 115 | 85 | 95 | 80 | 90 | 105 | 115 | 105 | 115 |
| I1 | 28,2 | 21,7 | 20,5 | 22,9 | — | — | — | — | 23,4 | 18,4 | — | — |
| I2 | — | — | — | — | 59,6 | 35,2 | 64,2 | 39,2 | — | — | 55,3 | 39,6 |
| Diethanolamine | 1,15 | 1,20 | 1,35 | 1,35 | 0,95 | 1,05 | 1,10 | 1,25 | 1,40 | 1,60 | 1,45 | 1,55 |
| CAT1 | 0,05 | 0,04 | 0,04 | 0,05 | 0,03 | 0,05 | 0,02 | 0,05 | 0,05 | 0,07 | 0,05 | 0,08 |
| CAT2 | 0,15 | 0,12 | 0,12 | 0,15 | 0,15 | 0,20 | 0,10 | 0,15 | 0,15 | 0,21 | 0,15 | 0,25 |
| Tin (II) octoate | 0,15 | 0,12 | 0,12 | 0,18 | 0,15 | 0,14 | 0,16 | 0,15 | 0,22 | 0,18 | 0,25 | 0,23 |
| SH 209 | 0,7 | 0,6 | 0,6 | 0,5 | 0,5 | 0,5 | 0,5 | 0,5 | 0,7 | 0,7 | 0,7 | 0,7 |
| TCEP | 2 | 2 | 2 | 2 | 3 | 3 | 5 | 5 | 2 | 2 | 2 | 2 |
| melamine | — | — | — | — | — | — | 25 | 25 | — | — | — | — |
| Foam weight (gr) | 129,6 | 124,0 | 123,3 | 125,4 | 160,1 | 138,4 | 191,0 | 169,1 | 125,8 | 122,0 | 157,0 | 143,0 |
| % by weight of water | 1,54 | 0,97 | 0,81 | 0,96 | 1,87 | 0,87 | 1,83 | 0,89 | 1,19 | 0,66 | 1,27 | 0,70 |
| Air (1/1 polyol) | — | — | — | — | 16,0 | — | 17,0 | — | 5,0 | — | 15,0 |
| Pressure (bar) | A | −0,35 | −0,45 | A | A | A | A | A | A | −0,2 | A | A |
| Rise time (sec) | 95 | 110 | 115 | 165 | 90 | 105 | 85 | 105 | 95 | 100 | 90 | 105 |
| Density (kg/m$^3$) | 43,6 | 43,9 | 42,8 | 43,1 | 35,9 | 35,8 | 38,7 | 39,6 | 56,4 | 54,6 | 52,8 | 52,3 |
| CLD 40% (kPa) | 3,2 | 2,9 | 2,8 | 2,9 | 2,2 | 1,9 | 2,5 | 2,3 | 3,6 | 3,5 | 4,2 | 3,9 |
| Elasticity (%) | 62 | 64 | 65 | 60 | 57 | 61 | 55 | 59 | 61 | 65 | 58 | 59 |
| CS 90% (%) | 4,3 | 3,6 | 2,8 | 5,6 | 6,0 | 2,4 | 11,5 | 6,7 | 3,2 | 2,2 | 2,2 | 1,9 |
| WCS 70% (%) | 11,3 | 9,6 | 5,2 | 8,3 | 19,7 | 10,5 | 37,6 | 15,4 | 7,8 | 4,1 | 2,8 | 1,7 |
| DF Δh (%) | 1,2 | 1,1 | 0,9 | 1,2 | 1,7 | 1,2 | 2,2 | 1,8 | 1,1 | 0,85 | 1,2 | 0,7 |
| ΔH (%) | 20,6 | 19,3 | 16,7 | 21,8 | 22,5 | 20,2 | 24,6 | 22,7 | 18,5 | 16,2 | 15,0 | 12,3 |
| SF Δh (%) | 2,1 | 1,8 | 1,5 | 1,5 | 2,4 | 1,9 | 3,8 | 2,1 | 1,9 | 1,5 | 1,6 | 1,2 |
| ΔH (%) | 24,3 | 22,7 | 19,1 | 26,2 | 25,8 | 23,0 | 30,4 | 22,9 | 20,4 | 17,8 | 19,5 | 18,4 |

*OF = 1,2

EXAMPLES 1 TO 4

In example 1, a polyurethane foam of a density of about 43 kg/m$^3$ was prepared in a conventional way. In examples 2 to 4, a polyurethane foam of substantially the same density was prepared with the same components so that different comfort properties are only the result of a different preparation method.

Examples 2 and 3 show that better comfort properties are obtained by reducing the amount of water and by compensating this reduction by allowing the reaction mixture to expand under a reduced pressure.

The method applied in example 4 is not according to the invention since use is made of more than 1.5 mole of the physical blowing agent R11 per polyol mole in order to obtain a density of about 43 kg/m$^3$. This example shows clearly that a smaller amount of water cannot be compensated for by physical blowing agents since in that case worse comfort properties are obtained. The balance between the polymerization and the blowing reactions is then out of equilibrium, which appears amongst others from the long rise time.

EXAMPLES 5 TO 8

Examples 5 and 6 show that a foam having better comfort properties can be prepared by adding air to the reaction mixture and by using less of the chemical blowing agent water in such a manner that substantially the same final density is obtained.

The same can be concluded by comparing examples 7 and 8. In the latter examples, melamine has been used as a flame retardant, which has a negative influence on the comfort properties of the foam.

It will be clear that in examples 5 and 7 no method according to the invention was applied and that these examples were only given to demonstrate the better results of the method according to the invention.

EXAMPLES 9 TO 12

The method applied in examples 9 and 11 is not a method according to the invention in contrast to the method applied in examples 10 and 12.

Compared to example 9, better comfort properties were obtained in example 10 although a foam of a somewhat lower density was produced. This is due to the fact that compared to example 9, less water was used while, in order to compensate for this smaller amount of water, air was added to the reaction mixture and the expansion was carried out under reduced pressure.

Compared to example 11, less water was used in example 12. By adding air to the reaction mixture and by carrying out the expansion in a closed mould at an overfill factor of 1.2, substantially the same density was however obtained. The overfill factor OF indicates the ratio between the real foam density and the foam density which would be obtained in an open mould. Also in this case, a clear improvement of the comfort properties can be noticed with respect to example 11.

Therefore, it is also possible to manufacture polyurethane foam plates with improved comfort properties on a continuous double-belt machine. These plates are for example suitable to make mattresses.

What is claimed is:

1. A method for the manufacture of flexible polyurethane foam having improved comfort properties and having a density between 35 and 70 kg/m$^3$ comprising:
    preparing a reaction mixture containing a polyether polyol of equivalent weight between 1400 to 2800 and having a primary hydroxyl group content of more than 50%, an organic polyisocyanate, a blowing agent and at least one catalyst; and
    allowing said reaction mixture to react so as to form said polyurethane foam;
    wherein said blowing agent comprises (1) water in an amount of 0.5 to 1% by weight with respect to total foam weight, and (2) a physical blowing agent in an amount of up to 1.5 moles per mole of said polyether polyol;

and wherein said density between 35 and 70 kg/m³ if provided by applying at least one density reducing technique selected from (1) forming a mechanically frothed reaction mixture of a reduced density when preparing said reaction mixture, or (2) allowing said reaction mixture to expand under a pressure lower than the atmospheric pressure.

2. The method as claimed in claim 1, wherein the density of the obtained polyurethane foam is limited between 40 and 65 kg/m³ by using at least one of said density reducing techniques.

3. The method as claimed in claim 1, wherein said pressure is 0.1 to 0.9 bar lower than the atmospheric pressure.

4. The method as claimed in claim 1, wherein said reaction mixture is frothed to a density comprised between 70 and 700 kg/m³.

5. The method as claimed in claim 1, wherein use is made of 0.5 to 0.8% by weight of water with respect to the total foam weight.

6. The method as claimed in claim 1, wherein for the expansion of the reaction mixture use is only made of water as a blowing agent.

7. The method as claimed in claim 1, wherein said polyether polyol contains up to 45% by weight at the most of an organic dispersed or dissolved solid substance.

8. The method as claimed in claim 7, wherein said polyether polyol contains 1 to 45% by weight of an organic dispersed or dissolved solid substance, the latter being of a type selected from the group of:

a polyaddition product of an alkanolamine and an organic polyisocyanate, a polymerisation product of an organic polyisocyanate with polyamine and/or hydrazine and/or hydrazide, a vinylcopolymer such as reaction products of acrylonitrile with styrene.

9. The method as claimed in claim 1, wherein said organic polyisocyanate consists mainly of pure, crude or prepolymerized MDI or of a mixture of these substances.

10. The method as claimed in claim 1, wherein flame retardants are added to the reaction mixture.

11. The method as claimed in claim 10, wherein said flame retardants comprise, per 100 parts of polyol, 5 to 100 parts of melamine.

12. The method as claimed in claim 10, wherein said flame retardants comprise, per 100 parts polyol, 5 to 75 parts of a linear urea-formaldehyde oligomer mixture, having the general formula $NH_2$-CO-NH-($CH_2$-NH-CO-NH)$_n$-$CH_2$-NH-CO-$NH_2$, wherein n can have a value from 0 to 10.

13. The method as claimed in claim 10, wherein said flame retardants comprise, per 100 parts polyol, 5 to 25 parts of of at least one halogenated organic flame retardant selected from tris monochloroethylphosphate, tris monochloroisopropylphosphate, or tris 1,3 dichloropropylphosphate.

14. The method as claimed in claim 1, wherein a mechanically frothed reaction mixture is formed which is allowed to expand between two belts of a continuous double belt machine so as to form a polyurethane foam plate having a thickness of between 0.01 and 0.2 m and a width of 1 to 2.5 m.

15. The method as claimed in claim 1, wherein a cross-linker/extender is added to said reaction mixture.

16. The method as claimed in claim 1, wherein a foam stabilizer is added to said reaction mixture.

* * * * *